Jan. 17, 1961 E. J. VOSLER 2,968,381
FRICTION PLATE
Filed Sept. 27, 1957
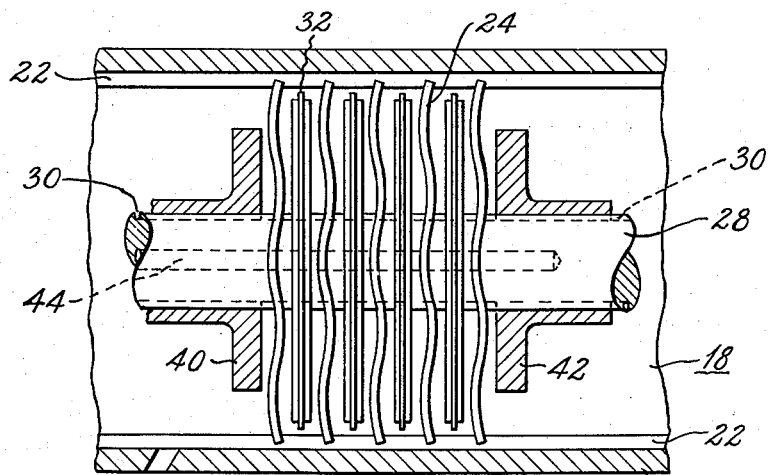
Fig. 1.
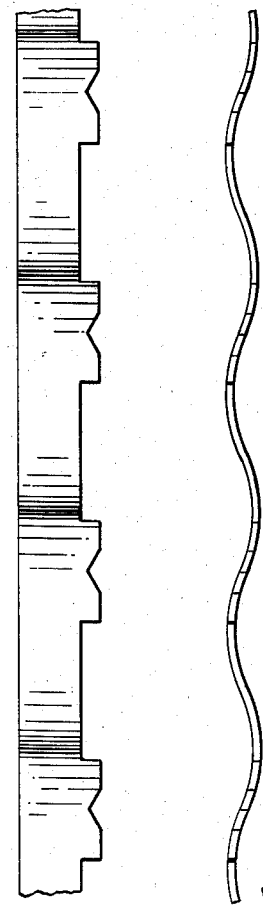
Fig. 3.
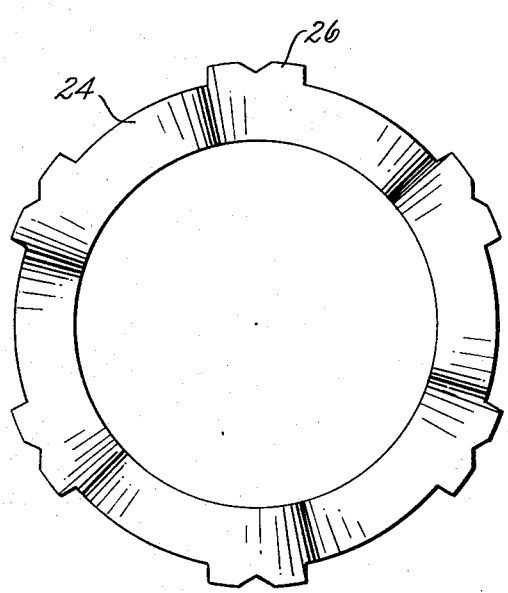
Fig. 2.
Fig. 4.
INVENTOR.
EDWARD J. VOSLER
BY
ATTORNEY

United States Patent Office 2,968,381
Patented Jan. 17, 1961

2,968,381
FRICTION PLATE

Edward J. Vosler, Dayton, Ohio, assignor to General Motors Corporation, Detroit, Mich., a corporation of Delaware Filed Sept. 27, 1957, Ser. No. 686,742

8 Claims. (Cl. 192—107)

This invention relates to plates for use in energy transmitting devices and is particularly concerned with waved plates as used in clutch packs and the like.

An object of the invention is to provide a plate that includes a plurality of waves therearound together with a plurality of driving lugs or splines equally spaced and predetermined in position with respect to said waves so that a plurality of said plates can be assembled in a clutch pack in nested position with respect to one another and without specific positioning of the several plates in order to align the splines.

Another object of the invention is to provide a clutch plate which includes a plurality of waves therearound together with a plurality of driving lugs at the inner or outer periphery thereof which lugs are positioned so that their center lines fall on radians intermediate the high and low point of adjacent waves.

Another object of the invention is to provide a waved clutch plate having equally spaced driving tangs, or lugs, at the internal or external periphery thereof wherein the number of lugs does not exceed the number of full waves in the plate, each lug being positioned so that its center line is on a radian which intersects adjacent waves intermediate the high and low points thereof.

Further objects and advantages of the present invention will be apparent from the following description, reference being had to the accompanying drawings wherein preferred embodiments of the present invention are clearly shown.

Figure 1 is a diagrammatic view of a clutch pack used in connection with an energy transmitting device such as an automatic transmission.

Figure 2 is a plan view of one of the clutch plates used in the device shown in Figure 1.

Figure 3 is a plan view of a partial development of the clutch plate showing the driving lugs and their relative position for the waves.

Figure 4 is an end view of the development shown in Figure 3.

In copending application, S.N. 579,331, now Patent No. 2,927,673, granted March 8, 1960, assigned to the assignee of the present invention, the advantages of using nested waved plates in a clutch pack are fully set forth. In this connection, where waved plates are used, it is highly desirable that the hills and valleys of the plates are aligned in the clutch pack assembly so that, when pressure is applied, the plates will nest. That is to say, all of the hills and all of the valleys will be aligned with respect to the axis of the plates.

In the past, this has been accomplished by placing an index mark in the die in which the plates are formed which index mark permits the assembler to stack the plates so that they are properly nested.

It has been found that, in production processing of these plates, there are frequent misalignments in clutch pack assemblies wherein one plate is either reversed or oriented with respect to the others so that it does not properly nest. When this condition occurs, the transmission does not function properly and, in many cases, the improperly assembled plate will cause a burning out of the facings on adjacent plates due to overheating.

The present invention is directed to a clutch plate which, due to its predetermined construction, cannot be assembled improperly, it being merely necessary to take a plurality of the plates without regard for their position with respect to one another and to merely align the driving lugs thereof whereupon the plates will be found to be in nested relation to one another. This is accomplished by proper positioning of the driving lugs with respect to the waves and by proper selection of the number of lugs to be used.

It is understood that, in the description to follow, while being directed to driving lugs at the outer periphery of the plate, similar methods can be employed where the lugs are positioned at the inner periphery of the plates which are annular in shape.

Referring specifically to Figure 1, a diagrammatic view of a clutch pack 18 such as is used in an automatic transmission is shown wherein an outer member 20 includes a plurality of longitudinally extending spline slots 22 therealong. The number of spline slots is similar to the number of splines or driving lugs provided on the plates. A plurality of waved clutch plates 24 having externally positioned splines 26 thereon are fitted into the slots 22 so that the splines 26 engage the slots whereby the member 20 and the plates 24 are substantially unitary and, if caused to turn, will turn as a unit. Within the member 20 is a shaft 28 which also includes a plurality of spline slots 30 around the outer periphery thereof. Engaged in the spline slots 30 are splines, not shown, carried at the inner periphery of plates 32. The plates 32 are alternated with the plates 24. The plates 32 are preferably faced at both sides thereof with a suitable facing material as fully disclosed in Almen and Carnegie Patent 2,733,797.

It is apparent, that the plates 32 rotate as a unit through their splines with the shaft 28 while the plates 24 rotate as a unit through their splines with the member 20. The plates 24 and 32 are normally out of substantial engagement with each other due to the springy nature of the waved plates 24. When it is desired to engage the device, pressure members, shown diagrammatically at 40 and 42, positioned on opposite ends of the shaft are moved by pressure means, not shown, to engage the two end plates 24. Continued movement presses the assemblies together until the waves of the plate 24 are substantially flat. During this movement, progressively greater engagement occurs between the plates 24 and the plates 32 until the shaft 28 and the member 20 rotate as a unit. When it is desired to disengage the clutch pack, the pressure members 40 and 42 are retracted whereupon the plates 24 and 32 separate due to the springy nature of the plates 24 plus the action of the oil which flows therebetween through a duct 44 in the shaft 28 which duct communicates through oil passages, not shown, at the outer surface of the shaft between the several plates. The aforegoing description is illustrative of one method of operation of a clutch pack of this general character and it is to be understood that the description sets forth only one means of using plates having waves with driving lugs thereon.

Referring specifically to Figure 2, the waved plate 24 is shown in detail. This plate includes six waves and six driving lugs, equally spaced around the outer periphery thereof. This figure may vary as desired and in accordance with the torque under which the plate must operate. The number of waves in the plate and the number of driving lugs may vary as described hereinafter.

The position of the driving lugs 26 relative to the waves is of utmost importance if the plate is to be reversible and universal with respect to stacking with other like plates. In this connection, Figure 3 shows a development of the plate showing the waves and driving lugs wherein four of the lugs are shown. Figure 4 is an end view of this development and it will be seen that the radial center line of each driving lug falls at the midpoint between the high point and the low point of adjacent waves and always on the same side of the waves. In other words, if the waves are likened to sine waves, the center point of each driving lug must fall at the intersection of the wave and its abscissa and be positioned on the same side of each wave. It is to be understood that, when the term sine wave is used herein, it encompasses any type of curve which has identical portions in reverse order above and below the abscissa of the curve and thus embraces smooth curves, angular curves, etc.

Under normal circumstances, there should be the same number of driving lugs as waves. That is to say, if there are six waves in the plate, there should be six driving lugs. However, the use of factors of the number of waves is possible without disturbing the universal nature of the plate providing the lugs are equally spaced and are positioned on the same side of the waves at the intersection of the waves with their abscissa. For example, in a six-wave plate, three driving lugs can be used providing they occur at every other wave. Also, two lugs may be used. Similarly, in a twelve-wave plate, the plate will be universal if provided with twelve lugs, six, four, three or two lugs positioned as set forth, etc. In all cases, when the driving lugs are aligned in a stack of these plates, the waves will likewise be aligned, which facilitates assembly of the pack since the plates may be assembled without regard for position by merely inserting the lugs in the spline slots whereupon the plates are properly positioned.

This type of plate not only reduces production cost but likewise improves the production since it is now impossible to improperly assemble a clutch pack of this character when using plates designed as set forth herein.

A specific example of a satisfactory plate for conventional automative use comprehends a steel plate formed from .070"±.002" stock with six lugs at its outer periphery. The plate has an outer diameter of 5.060" and an inner diameter of 3.860" with the over-all outer diameter of the lug portions being 5.470 inches. Each lug extends about one inch around the outer periphery of the plate. The waves have an average height from a flat surface of from .008" to .012" whereby a fully waved plate will pass between vertical flat plates spaced .088" apart without distortion.

As the diameter of the plate increases, the thickness should also increase as should the height of the wave. If the plate is to be used in heavy duty applications as in transmissions used for tanks, tractors, or heavy trucks, etc., the thickness and diameter of the plate must be chosen to provide the required torque carrying capacity. In other words, the specific example noted herein is only one of many embodiments that is useful and should not be considered limiting in nature.

In some cases, friction facings may be included at one or both sides of the plates which have different frictional characteristics than the metal of the plate. Also, plates of this character may be used in other frictional devices such as disc type brakes and the like. The waves are preferably of a conical nature comprising surfaces generated by a radius rotating from the center of the disc and undulating between fixed limits at its outer end only.

While the embodiments of the invention as herein disclosed constitute preferred forms, it is to be understood that other forms might be adopted.

What is claimed is as follows:

1. A friction plate comprising an annulus of sheet metal, a plurality of driving lugs equally spaced at one periphery thereof, said plate having its surface undulated in a sine wave pattern of at least three full peripheral waves, wherein the number of said driving lugs is not in excess of the number of full waves on the plate and wherein the driving lugs are positioned on the same side of the several waves so that their radial centers are at the intersection of the waves and their abscissae.

2. The plate claimed in claim 1 wherein the plate has a waved pattern on the surface thereof consisting of six full waves and wherein six driving lugs are used at one periphery of the plate.

3. The plate claimed in claim 1 wherein the plate has a waved pattern on the surface thereof consisting of six full waves and wherein six driving lugs are used at the outer periphery of the plate.

4. The plate claimed in claim 1 wherein the plate has a waved pattern on the surface thereof consisting of six full waves and wherein six driving lugs are used at the inner periphery of the plate.

5. The friction plate claimed in claim 1 wherein the plate has a waved pattern on the surface thereof consisting of three full waves and wherein the number of driving lugs at the outer periphery of the plate comprises three.

6. A friction plate comprising an annulus of sheet metal, a plurality of driving lugs equally spaced around one periphery thereof, said plate having its surface undulated in a sine wave pattern comprising at least three full peripheral waves and not more than twenty-four full peripheral waves wherein the number of driving lugs is between two and twenty-four which lugs are positioned on the same side of the several waves so that their radial centers are at the intersection of the waves and their abscissae.

7. The friction plate claimed in claim 4 wherein the driving lugs are positioned around the outer periphery of the plate.

8. The friction plate claimed in claim 4 wherein the driving lugs are positioned around the inner periphery of the plate.

References Cited in the file of this patent

UNITED STATES PATENTS

| 1,340,885 | Fuller | May 25, 1920 |

FOREIGN PATENTS

| 457,206 | Great Britain | Nov. 24, 1936 |
| 578,289 | Great Britain | June 21, 1946 |
| 535,652 | Canada | Jan. 8, 1957 |